(12) United States Patent
Gray

(10) Patent No.: US 12,351,124 B2
(45) Date of Patent: Jul. 8, 2025

(54) SEAT BELT PRETENSIONER

(71) Applicant: Joyson Safety Systems Acquisition LLC, Auburn Hills, MI (US)

(72) Inventor: Mark Gray, Macomb, MI (US)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 0 days.

(21) Appl. No.: 18/601,955

(22) Filed: Mar. 11, 2024

(65) Prior Publication Data

US 2024/0270202 A1 Aug. 15, 2024

Related U.S. Application Data

(63) Continuation of application No. 17/137,218, filed on Dec. 29, 2020, now Pat. No. 11,926,280.

(60) Provisional application No. 62/955,611, filed on Dec. 31, 2019.

(51) Int. Cl.
*B60R 22/46* (2006.01)

(52) U.S. Cl.
CPC .. *B60R 22/4628* (2013.01); *B60R 2022/4642* (2013.01)

(58) Field of Classification Search
CPC ............... B60R 22/46; B60R 22/4628; B60R 2022/4638; B60R 2022/4642
See application file for complete search history.

(56) References Cited

U.S. PATENT DOCUMENTS

| | | | |
|---|---|---|---|
| 5,485,970 A | 1/1996 | Steffens, Jr. | |
| 5,495,994 A | 3/1996 | Rumpf et al. | |
| 7,370,721 B2 | 5/2008 | Zelmer et al. | |
| 9,630,588 B2 | 4/2017 | Betz et al. | |
| 10,017,150 B2* | 7/2018 | Asako | B60R 22/36 |
| 10,300,883 B2* | 5/2019 | Asako | B60R 22/4628 |
| 10,723,311 B2* | 7/2020 | Yanagawa | B60R 22/405 |
| 10,744,975 B2* | 8/2020 | Yanagawa | B60R 22/34 |

(Continued)

FOREIGN PATENT DOCUMENTS

| | | |
|---|---|---|
| JP | 2002-019579 A | 1/2002 |
| KR | 10-2014-0038218 A | 3/2014 |
| WO | 2006/040027 A1 | 4/2006 |

OTHER PUBLICATIONS

International Search Report and Written Opinion dated Apr. 6, 2021 issued in related International Patent Application No. PCT/2020/067423; filed Dec. 30, 2020.

*Primary Examiner* — Sang K Kim

(74) *Attorney, Agent, or Firm* — Gordon Rees Scully & Mansukhani, LLP

(57) ABSTRACT

A seat belt pretensioner for a seat belt device in a vehicle, the pretensioner including a frame, a ball housing attached to the frame and a drive wheel located within the ball housing. A spool is connected to the drive wheel and is fixed to one end of a seat belt webbing so that the webbing may be wound around the spool. The pretensioner further includes a pipe connected to the ball housing and a gas generator connected to the pipe. At least one power transmission element is carried in the pipe and is driven by gas provided from the gas generator to contact the drive wheel and rotate the spool to retract the seat belt. A seal member is located between the at least one power transmission element and the gas generator. The seal member is sized to plug the pipe at an inlet to the ball housing.

20 Claims, 9 Drawing Sheets

(56) References Cited

U.S. PATENT DOCUMENTS

| | | | |
|---|---|---|---|
| 11,926,280 B2 * | 3/2024 | Gray | ............... B60R 22/4628 |
| 2007/0262186 A1 | 11/2007 | Hiramatsu | |
| 2010/0181408 A1 | 7/2010 | Suhr et al. | |
| 2011/0140501 A1 | 6/2011 | Shiotani et al. | |
| 2012/0006926 A1 | 1/2012 | Burrow et al. | |
| 2012/0248847 A1 | 10/2012 | Shiotani et al. | |
| 2014/0291432 A1 | 10/2014 | Betz et al. | |
| 2017/0291574 A1 | 10/2017 | Suzuki et al. | |

\* cited by examiner

SEAT BELT PRETENSIONER

CROSS-REFERENCE TO RELATED APPLICATIONS

This application claims priority to and the benefit of U.S. Provisional Application No. 62/955,611 filed on Dec. 31, 2019. The foregoing provisional application is incorporated by reference herein in its entirety.

GENERAL DESCRIPTION

The present disclosure relates to a seat belt system. In particular, a seat belt pretensioner that includes a system for locking the spool of the pretensioner.

The anchor of a seat belt system of a vehicle may comprise a pretensioner device (e.g., a pyrotechnic driven device) for tensioning the seat belt. The pretensioner is provided for removing slack in the webbing during an emergency, such as a vehicle collision. A typical lap seat belt pretensioner may use a cable driven mechanism in order to pull the seat belt to remove slack during emergency situations. During the pretensioning event, the high-pressure operating gas may leak due to tolerances between elements of the cable system. The leakage of gas may reduce the effectiveness of the pretensioner and may release hot, pressurized gas into the vehicle environment.

As described herein, a superior functioning alternative to the cable type pulling pretensioner mechanism utilizes spherical-shaped members (e.g., ball shaped) that act as a power transmission system for rotating a seat belt webbing spool during an emergency. The power transmission system may include a pretensioner tube or pipe configured as a pressure container. A gas generator is disposed at one end of the pretensioner pipe and during an emergency, such as a vehicle collision, a hot, high-pressure operating gas is supplied from the gas generator to the inside of the pretensioner pipe. The operating gas forces a piston to slide along the inside of the pretensioner pipe and the piston presses against one of the spherical shaped members forcing one or more of the spherical shaped members to engage teeth of a drive wheel thereby rotating the spool in order to tension the seat belt. The tensioning of the seat belt may be configured to occur immediately after an impact of the vehicle to enhance occupant restraint performance. The pretensioning system described herein provides for pushing the ball shaped power transmission members which provides for better gas sealing over the cable type pretensioners which use the generated gas to pull the cable and tension the seat belt webbing.

Accordingly, it is desired to provide a push type pretensioner system for a seat belt system.

SUMMARY

According to one disclosed embodiment, a pretensioner for a seat belt device in a vehicle is disclosed herein. The pretensioner includes a frame, a ball housing attached to the frame, and a drive wheel located within the ball housing. A rotating spool is connected to the drive wheel and is fixed to one end of a seat belt webbing so that the webbing may be wound around the spool. The spool is rotatably mounted to the frame and configured to rotate in a pretensioning direction in response to an acceleration of the vehicle greater than a predetermined high acceleration. A pipe is connected to the ball housing and a gas generator connected to the pipe. The pretensioner includes at least one ball shaped power transmission element carried in the pipe that is driven by gas provided from the gas generator when the pretensioner device is activated so that the at least one power transmission element can contact the drive wheel to thereby rotate the spool to retract the seat belt. The seal member is located between the at least one power transmission element and the gas generator. The seal member is configured to travel through the pipe after the pretensioner device is activated and is sized to plug the pipe at an inlet to the ball housing.

The pretensioner may include a ratchet ring disposed adjacent to the ball housing and connected to the spool. A spring may be provided to bias the ratchet ring towards the ball housing. According to one embodiment, the ratchet ring is configured to engage the ball housing when the webbing is pulled in an engagement direction so that the spool is prevented from rotating in a direction that allows extraction of the seat belt webbing. The ball housing comprises a ramp configured to allow the at least one transmission element to travel in a spiral path in the ball housing. The ratchet ring includes ratchet teeth and the ball housing includes housing teeth. The ratchet teeth ride over the housing teeth when the drive wheel rotates in the pretensioning direction to cause retraction of the seat belt. The ratchet teeth and the housing teeth engage when the webbing is pulled in an engagement direction opposite to the pretensioning direction.

According to another embodiment, the pretensioner may include a first ratchet wheel disposed adjacent to the spool and located at a first end of the spool, and pawl attached to the frame is configured to engage the first ratchet wheel. The first ratchet wheel is configured to engage the pawl when the webbing is pulled in an engagement direction, wherein the engagement direction is opposite to the pretensioning direction. The pretensioner may include a second ratchet wheel disposed adjacent to the spool and located at a second end of the spool. The pawl may extend the length of the spool and is configured to engage the second ratchet wheel; wherein the pawl includes two free ends and wherein each of the free ends engages one of the first and second ratchet wheels when the webbing is pulled in the extraction direction.

According to a disclosed embodiment a pretensioner for a lap seat belt of a seat belt device in a vehicle is provided. The pretensioner includes a frame, a ball housing attached to the frame, a drive wheel located within the ball housing, and a rotating spool connected to the drive wheel and configured to be fixed to one end of a seat belt webbing so that the webbing may be wound around the spool. The spool is rotatably mounted to the frame and is configured to rotate in a pretensioning direction in response to an acceleration of the vehicle greater than a predetermined high acceleration. The pretensioner includes a ratchet ring disposed adjacent to the ball housing and connected to the spool, and a spring configured to bias the ratchet ring towards the ball housing. The pretensioner includes at least one ball shaped power transmission element carried in a pipe that is driven by gas provided from a gas generator when the pretensioner device is activated so that the at least one power transmission element can contact the drive wheel to thereby rotate the spool to retract the seat belt. The ratchet ring is configured to engage the ball housing when the webbing is pulled in an engagement direction so that the spool is prevented from rotating in a direction that allows extraction of the seat belt webbing.

The ball housing may include a ramp configured to allow the at least one transmission element to travel in a spiral path in the ball housing. An end cap may be connected to the ball housing and the at least one transmission element is configured to move towards the end cap in the spiral path of the ball housing. The ratchet ring may include ratchet teeth and the ball housing includes housing teeth, and wherein the ratchet teeth ride over the housing teeth when the drive wheel rotates in the pretensioning direction to cause retraction of the seat belt. The ratchet teeth and the housing teeth may engage when the webbing is pulled in an engagement direction opposite to the pretensioning direction. The pretensioner may include at least one seal member located between the at least one power transmission element and the gas generator, wherein the seal member is configured to prevent gas from leaking out of the pipe. The seal member may be configured to travel through the pipe after the pretensioner device is activated and is sized to plug the pipe at an inlet to the ball housing.

According to another disclosed embodiment, a seat belt pretensioner for a seat belt device in a vehicle is provided. The pretensioner includes a frame, a ball housing attached to the frame, a drive wheel located within the ball housing, and a spool rotationally locked to the drive wheel and configured to be fixed to one end of a webbing so that the webbing may be wound around the spool. The spool is rotatably mounted to the frame and is configured to rotate in a pretensioning direction in response to an acceleration of the vehicle greater than a predetermined high acceleration. A first ratchet wheel is disposed adjacent to the spool and located at a first end of the spool. A pawl is attached to the frame is configured to engage the first ratchet wheel. The pretensioner also includes at least one power transmission element carried in a pipe that is driven by gas provided from a gas generator when the pretensioner device is activated so that the at least one power transmission element can contact the drive wheel to thereby rotate the spool in the pretensioning direction. The first ratchet wheel is configured to engage the pawl when the webbing is pulled in an engagement direction, wherein the engagement direction is opposite of the pretensioning direction.

The ball housing may include a ramp configured to allow the at least one transmission element to travel in a spiral path in the ball housing. An end cap may be provided wherein the at least one transmission element is configured to move towards the end cap in the spiral path of the ball housing. The pretensioner may further include a second ratchet wheel disposed adjacent to the spool and located at a second end of the spool, wherein the pawl extends the length of the spool and is configured to engage the second ratchet wheel. The pawl may include two free ends and each of the free ends may be configured to engage one of the first and second ratchet wheels when the webbing is pulled in the extraction direction opposition of the pretensioning direction. The pawl may be biased toward the ratchet wheels by a spring retaining clip.

BRIEF DESCRIPTION OF THE DRAWINGS

The features, aspects, and advantages of the present disclosure will become apparent from the following description, and the accompanying exemplary embodiments shown in the drawings, which are briefly described below.

DETAILED DESCRIPTION

Described herein is a lap belt pretensioner system of a seat belt system of a vehicle. The pretensioning system includes a frame, a spool rotationally connected to the frame and configured to wind a webbing of a seat belt system of a vehicle. A ball housing may be attached to the frame, and a drive wheel may be located within the ball housing and connected to the spool. A pipe is connected to a gas generator and contains a plurality of power transmission members. The power transmission members are preferably spherical or ball shaped. In an alternative embodiment, the plurality of power transmission members described herein may be replaced by a single rod shaped power transmission member. The rod shaped member may comprise a malleable plastic material.

The pipe is attached to the ball housing. The gas generator is configured to release gas to push the ball shaped power transmission members into the ball housing in order to rotate the drive wheel. The drive wheel rotates the spool in a tensioning direction, which winds the webbing around the spool and retracts the webbing in order to remove slack from the webbing securing a passenger of the vehicle.

The pretensioner may include a rotating ratchet ring that is disposed coaxially and rotationally locked relative to the spool. The ratchet ring is disposed adjacent to the ball housing and biased towards the ball housing by a wave spring. The ball housing includes housing teeth that project towards the ratchet ring. The ratchet ring includes ratchet ring teeth complimentary to and interlocking with the ball housing teeth in one direction (i.e., the engagement direction). The interface between the ratchet ring teeth and ball housing teeth is configured to allow the ratchet ring, drive wheel, and spool to rotate in a pretensioning direction while preventing the ratchet ring, drive wheel, and spool from rotating in the engagement direction after the teeth of the ratchet ring and ball housing are engaged to thereby prevent the seat belt webbing from being extracted from the spool.

According to a second embodiment of a lap pretensioner described herein, instead of a single ratchet wheel as described above, a pair of ratchet wheels are disposed on opposite ends of the spool and are rotationally locked to the spool. A pawl is attached to the frame and extends between two flanges of the frame. The pawl is biased by a spring retaining clip configured to hold the pawl onto the frame and bias the pawl to the pair of ratchet wheels. The ratchet wheels and the pawl interface so that the pawl does not restrict rotating of the ratchet wheels in the seat belt tensioning direction. Thus, the spool may be driven by the rotation of the drive wheel when the transmission members are pushed down the pipe and into the ball housing. However, the pawl prevents the ratchet wheels from rotating in the engagement direction to thereby prevent the spool from rotating and the webbing from being extracted.

Figure 1:
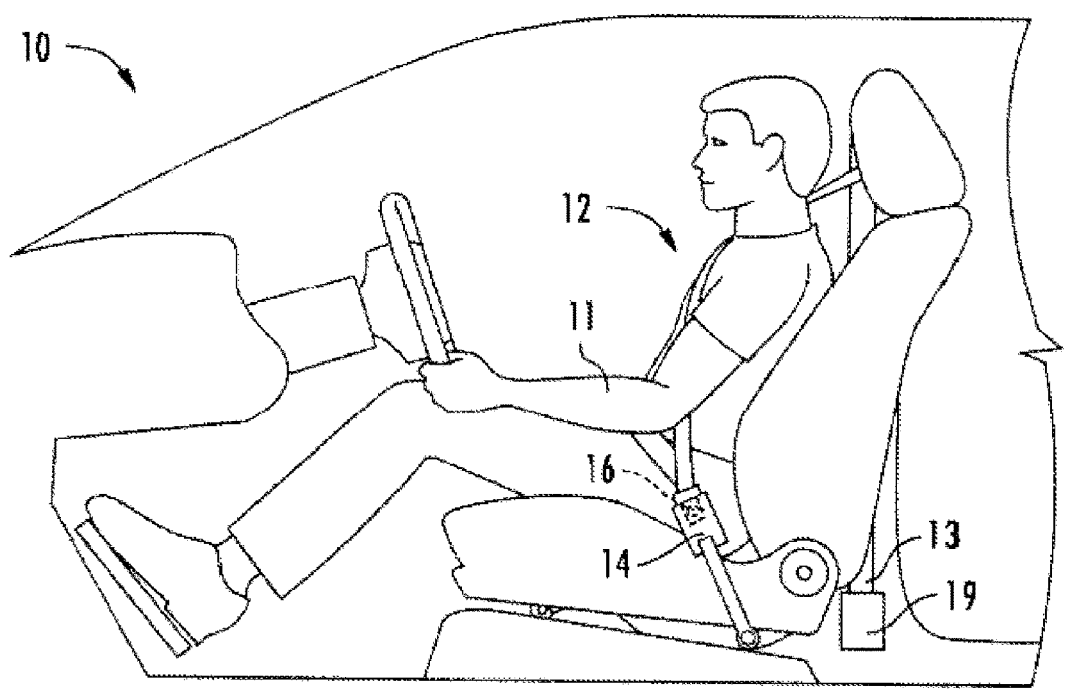
FIG. 1 is a left side view of a vehicle showing a seat belt system including a pretensioner device.
Figure 2:
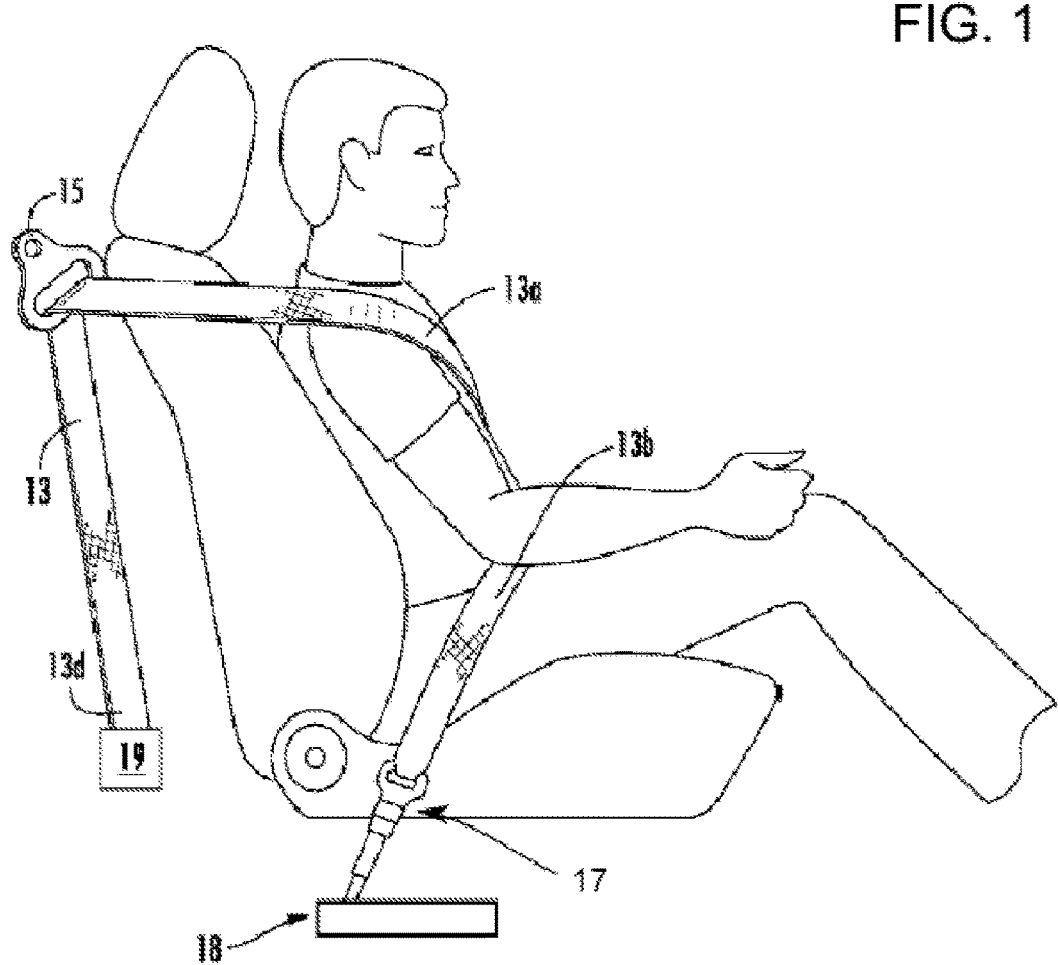
FIG. 2 is a right side view of the seat belt system of FIG. 1.

FIGS. 1 and 2 illustrate an exemplary embodiment of a vehicle 10 having an interior compartment that is configured to provide seating to an occupant 11. The vehicle 10 includes a seat belt assembly 12 that is configured to secure (e.g., restrain) the occupant 11 when seated in a seat assembly of the vehicle 10.

As shown, the seat belt assembly 12 (e.g., seat belt system, occupant restraint device, etc.) includes a seat belt 13 (e.g., a webbing) having a shoulder portion 13a and a lap portion 13b that are separated by a tongue member 16 that is configured to selectively (e.g., releasably) engage a buckle mechanism 14. The lap portion 13b of the seat belt 13 is configured to generally wrap around the lap of the occupant 11 to restrain the lower portion of the occupant 11 during a dynamic vehicle event. The lap portion 13b may have an end disposed opposite the tongue member 16 that is configured to be fixed, such as, for example, to a pretensioning device 18 (e.g., a pretensioner). The shoulder portion 13a of the seat belt 13 is configured to generally wrap around the torso and shoulder of the occupant to restrain the torso or thorax of the occupant during a dynamic vehicle event.

The shoulder portion 13a may have an end 13d disposed opposite the tongue member 16 that is configured to be secured, for example retractably secured, to a retractor 19. The seat belt 13 is configured to wind (e.g., retract) and unwind (e.g., extract) about the retractor 19. The retractor 19 may be integrated with the seat or attached to the vehicle 10. The seat belt assembly 12 may also include a guide 15 (e.g., a D-ring, etc.), for guiding the shoulder portion 13a of the seat belt 13. The seat belt assembly 12 may have any suitable configuration and may include fewer or additional components to restrain and secure an occupant in a vehicle, and the example disclosed herein is not limiting.

The pretensioner 18 is configured to pretension the seat belt 13, such as during a dynamic vehicle event (e.g., a frontal impact), by removing an amount of slack between the seat belt 13 and the occupant 11 that is present at the onset of the dynamic vehicle event. For example, the pretensioner 18 may retract the webbing 13 by rotating a spool to thereby displace the end of the seat belt 13 that is connected to the spool a corresponding distance to remove slack between the occupant 11 and the seat belt 13. The seat belt assembly 12 may include one or more sensors (not shown) configured to detect an emergency event (e.g. vehicle collision). Although described herein as an anchor mounted pretensioner (e.g. anchor 17), the disclosed embodiments of the pretensioner may be mounted to the portion of the seat belt webbing 13 connected to the buckle 14.

Figure 3:
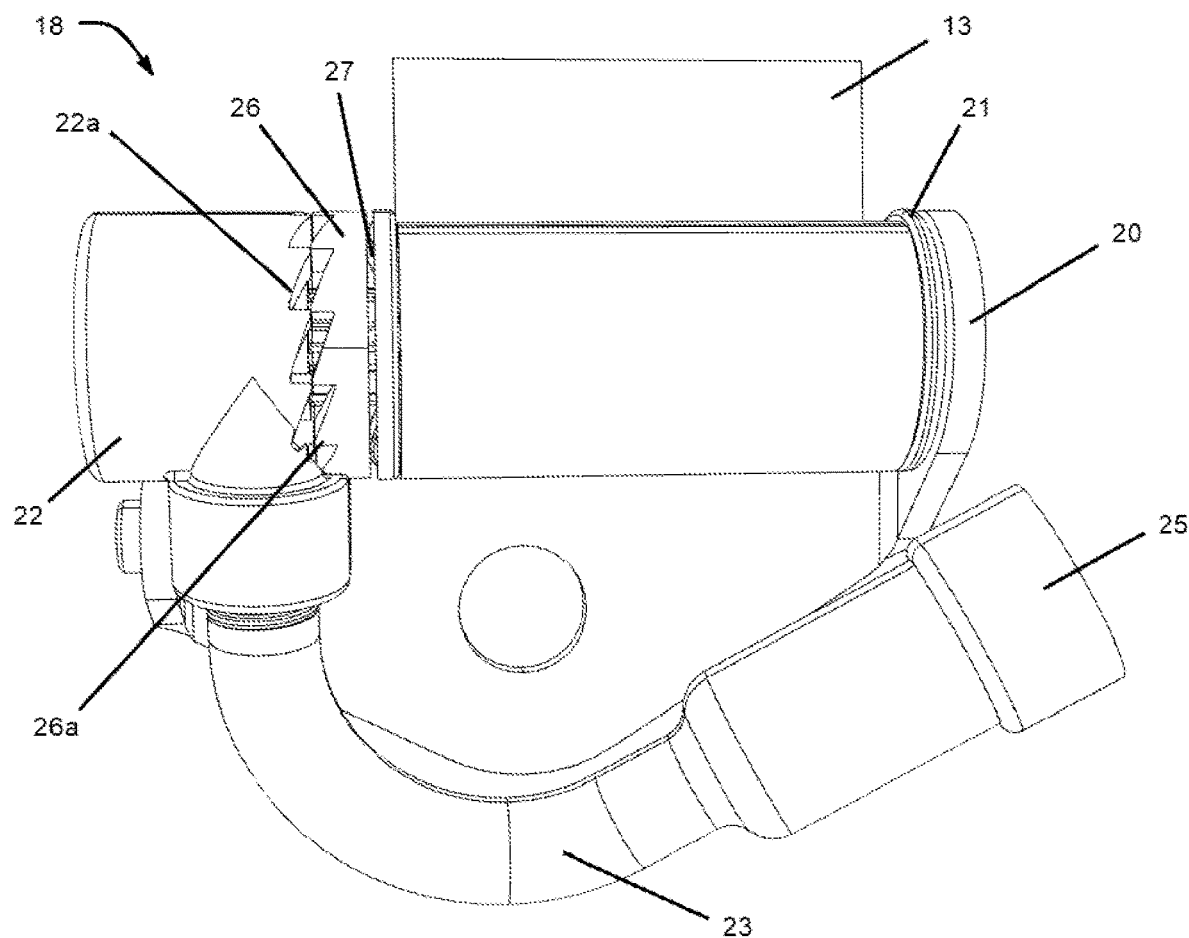
FIG. 3 is a front view of a pretensioning device of the seat belt system of FIGS. 1-2.

FIG. 3 shows a first embodiment of the pretensioner 18. The pretensioner 18 includes a spool 21 rotatably attached to a pretensioner frame 20. The webbing 13 is affixed to the spool 21 and is configured to be wound around the spool 21 when the spool rotates in a retracting direction. The webbing 13 may be affixed to the spool 21 by any known and suitable attaching mechanisms in the art of seat belt systems. A ball housing 22 is disposed on the opposite end of the frame and may be fastened onto the frame 20. A ratchet ring 26 and a wave spring 27 are located between the ball housing 22 and the spool 21. The ratchet ring 26 includes ratchet teeth 26a configured to engage ball housing teeth 22a in one direction (i.e. engagement direction). The ratchet teeth 26a and the ball housing teeth 22a are configured to pass (e.g., slide past) each other in the other direction (i.e. pretensioning direction). The wave spring 27 biases the ratchet ring 26 towards the ball housing teeth 22a. The ball housing 22 is attached to a pipe 23 which houses a gas generator 25 at the upstream end.

Figure 4:
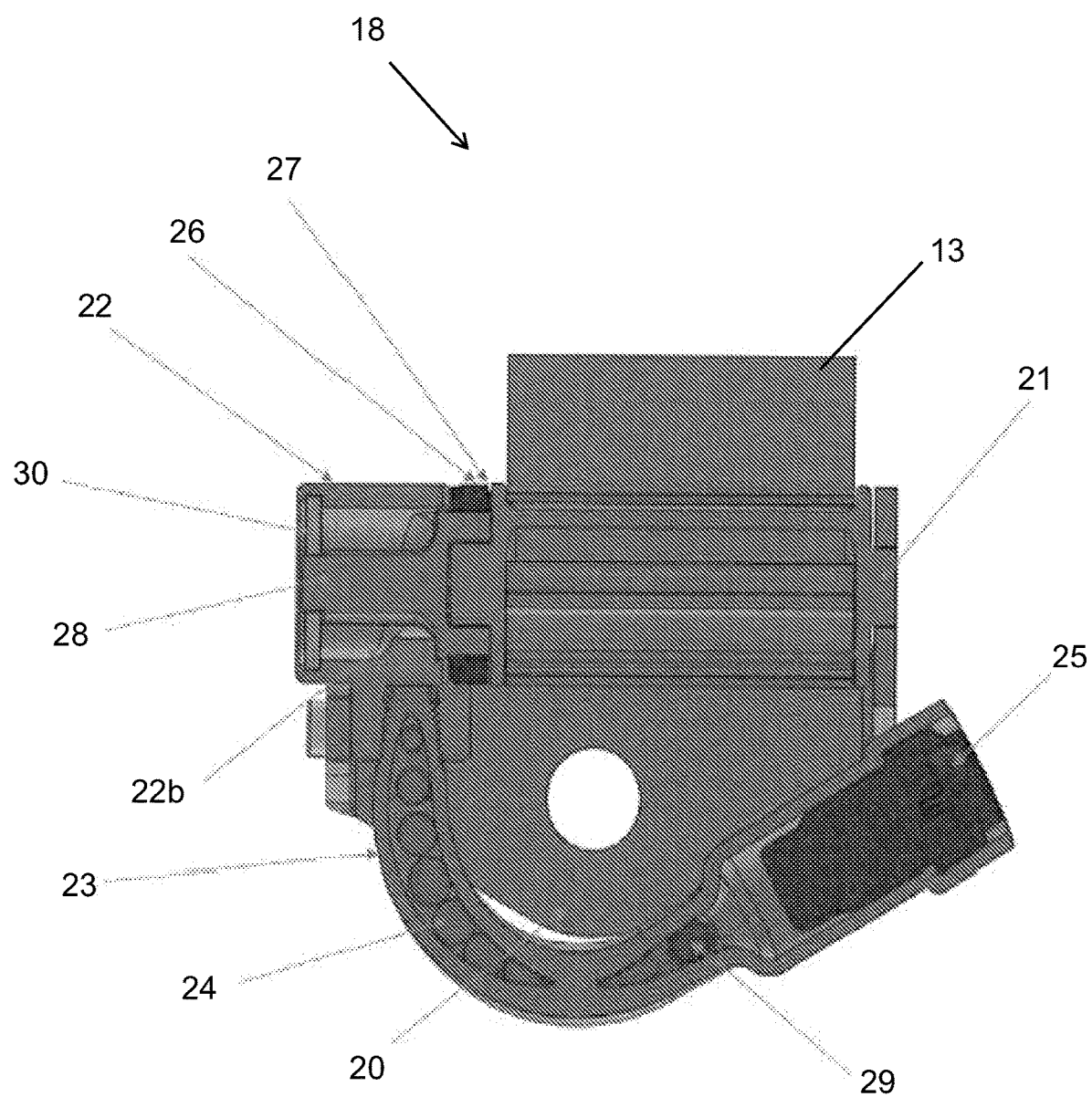
FIG. 4 is a front cutaway view of the pretensioning device of FIG. 3.

FIG. 4 is a cross sectional view of the pretensioner 18. The pipe 23 houses a plurality of power transmission members 24. Each of the power transmission members 24 is, for example, a ball or spherical body. The power transmission members 24 are, for example, formed of a material with a lower specific gravity than iron (e.g., aluminum, aluminum alloy, or the like). Adopting a material with a lower specific gravity than iron enables weight reduction of the power transmission member 24. In other embodiments, the power transmission members 24 may be formed of an iron based material such as stainless steel. It should be noted that the shape of the power transmission member 24 is not limited to spherical body. For example, it may have other shapes such as a cylindrical body, a prismatic body, and oval rotational body. In another embodiment, a rod or extended body may be employed, such as a polymer based rod. The gas generator 25 is configured to supply a gas into the pipe 23. The gas is typically a high-temperature high-pressure gas, and the pipe is generally formed of an iron based material (stainless steel or the like) that is configured to withstand the heat and provide resistance to the high pressure.

The power transmission members 24 are configured to rotate a drive wheel 28 located within the ball housing 22. The drive wheel 28 is rotationally locked to the spool 21. The ratchet ring 26 is disposed radially outwards towards the drive wheel 28 and is configured to be rotationally locked to the drive wheel 28 via a spline located externally on the drive wheel 28. Thus, the spool 21, the ratchet ring 26, and the drive wheel 28 are rotationally locked to each other. The ball housing 22 includes a ramp 22b for guiding the power transmission members 24 onto an outer periphery of the drive wheel 28. The wave spring 27 and the ratchet ring 26 may be disposed coaxially relative to each other and relative to the rotation axis of the drive wheel 28. An end cap 30 may be disposed at one end of the ball housing 22. The end cap 30 encloses the ball housing 22 keeping the power transmission members 24 and gas sealed within the pretensioner 18.

During a pretensioning event (e.g., a dynamic impact event involving the vehicle), the gas generator 25 is actuated to supply gas into the pipe 23. The power transmission members 24 are pushed by the gas to move within the pipe 23 and into the ball housing 22. The power transmission members 24 are configured to engage and rotate the drive wheel 28. Rotation of the drive wheel 28 causes a corresponding rotation of the spool 21 in order to remove slack from the webbing 13. A seal member 29 is provided between the power transmission members 24 and the gas generator 25 in order to prevent gas from leaking out of the pipe 23. The seal 29 travels a limited distance with the power transmission members 24 and is provided to plug the pipe 23 at the inlet to the ball housing 22. The pipe 23 is configured to enclose a high-temperature high-pressure gas, it is generally formed of an iron based material (stainless steel or the like) that is configured to provide heat and pressure resistance. The pipe 23 may include a threaded end configured to be threaded onto the ball housing 22.

Figure 7:
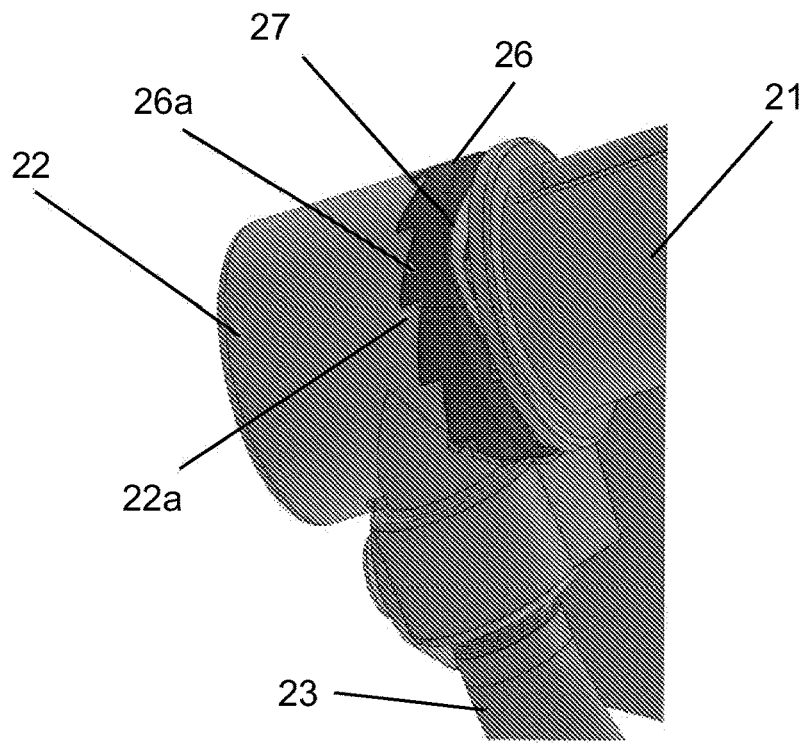
FIG. 7 is a close up view of the pretensioning device of FIG. 3 in an engaged position.

The ratchet teeth 26a are each configured to engage one of the housing teeth 22a in the engagement direction while configured to pass by each other when the drive wheel 28 is driven in the pretensioning direction. The wave spring 27 biases the ratchet ring 26 towards the housing teeth 22a. During the pretensioning event, the drive wheel 28 is rotated by the power transmission members 24 in the pretensioning direction. Rotation of the drive wheel 28 in the pretensioning direction allows the ratchet ring teeth 26a to ride over the housing teeth 22a in order to remove slack from the webbing. The ratchet ring teeth 26a engage the housing teeth 22a and prevent the spool from rotating due to occupant loading from the sudden vehicle deceleration. The occupant load on the webbing 13 imparts a force to the spool 21 in the engagement direction and allows the ratchet ring teeth 26a to engage and lock onto the housing teeth 22a, holding the drive wheel 28 and the spool 21 together, preventing extraction of the webbing 13 as shown in FIG. 7.

Figure 5:
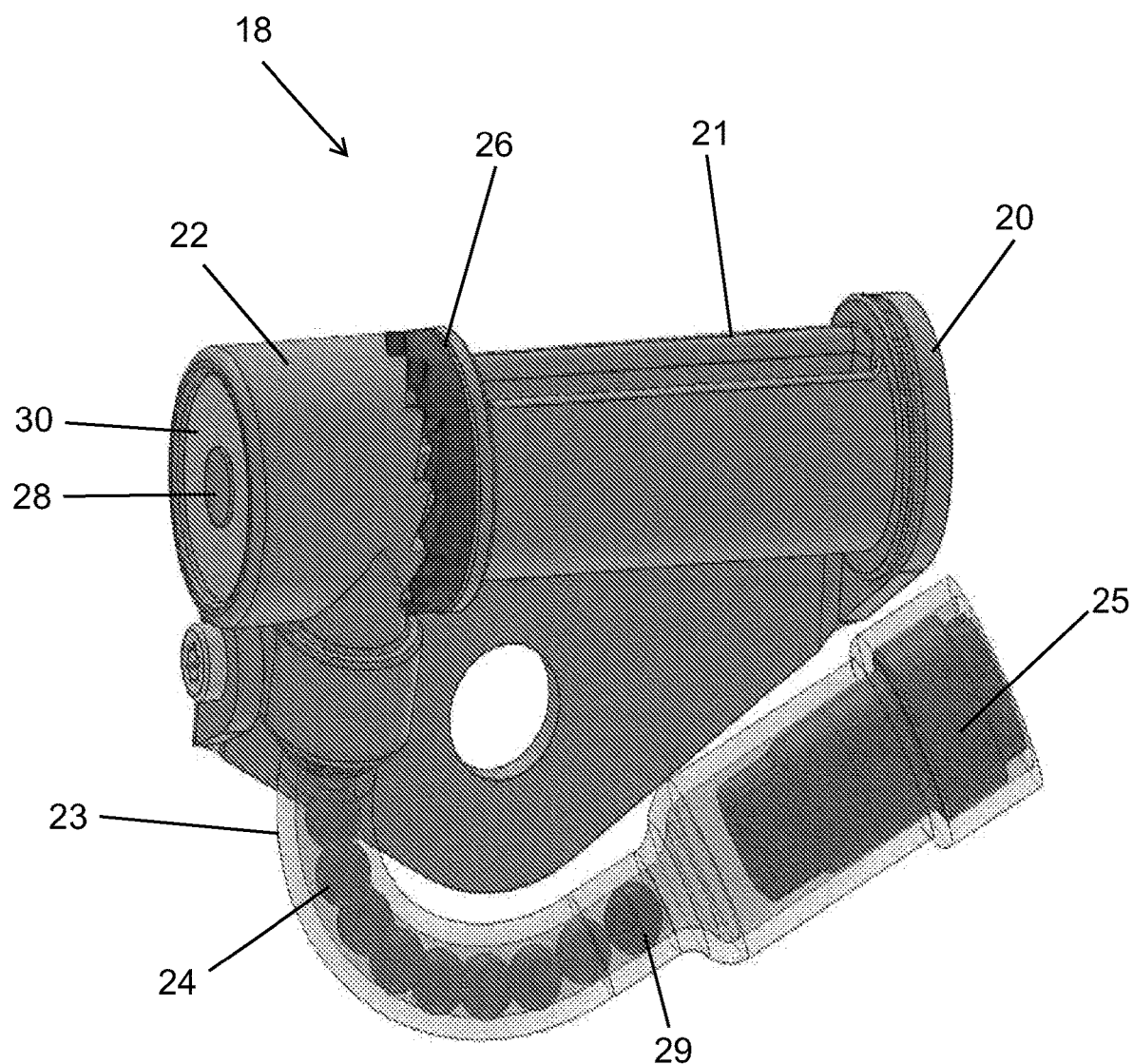
FIG. 5 is the pretensioning device of FIG. 3 including, for ease of viewing, a transparent pretensioner pipe.

FIG. 5 is an isometric view of the pretensioner 18 including a transparent pipe 23 that is included for demonstrative purposes to facilitate viewing of the power transmission members 24 and gas generator 25 housed in the pipe 23.

Figure 6:
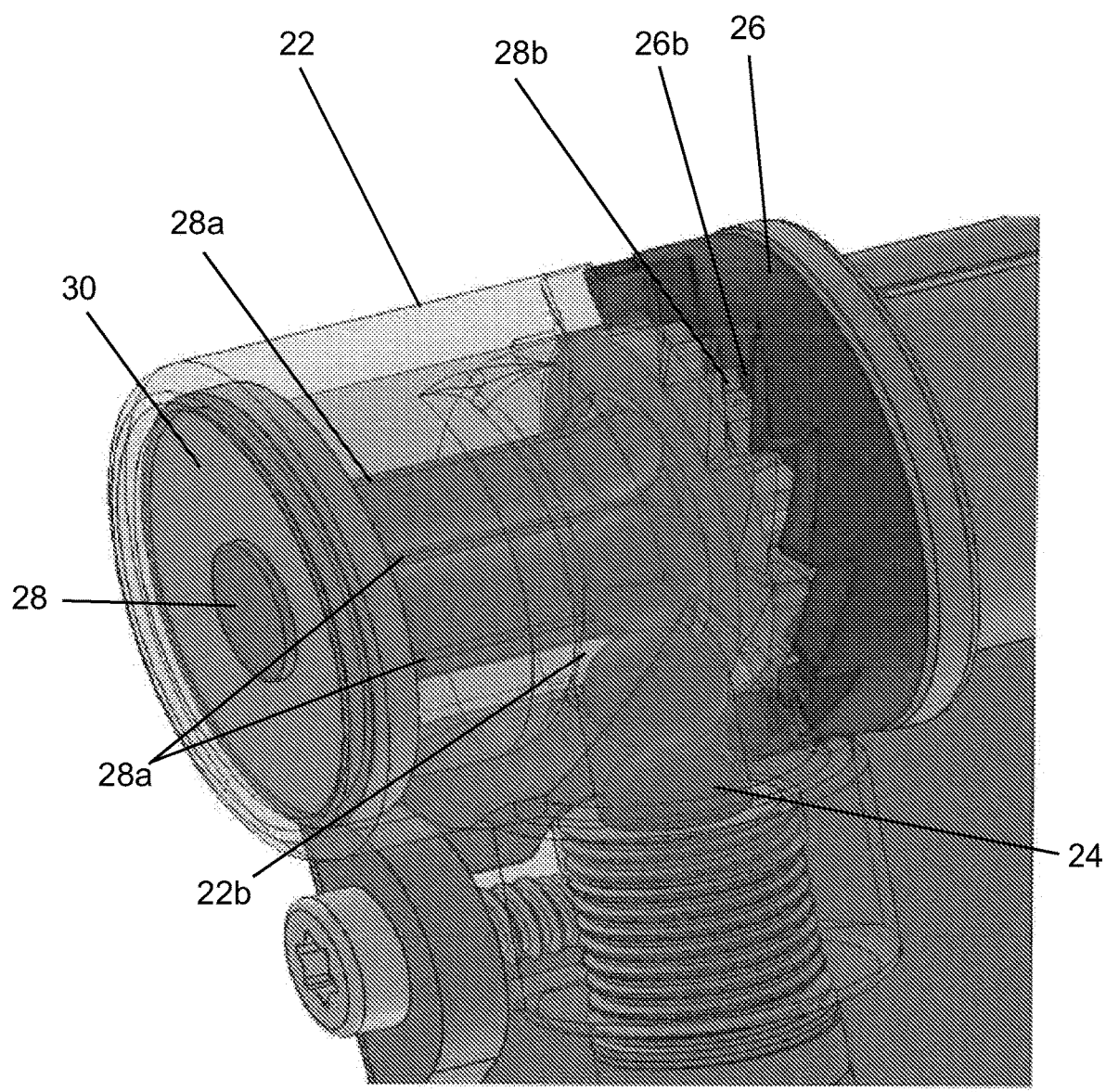
FIG. 6 is a transparent close up view of the ball housing of the pretensioning device of FIG. 3.
Figure 8A:
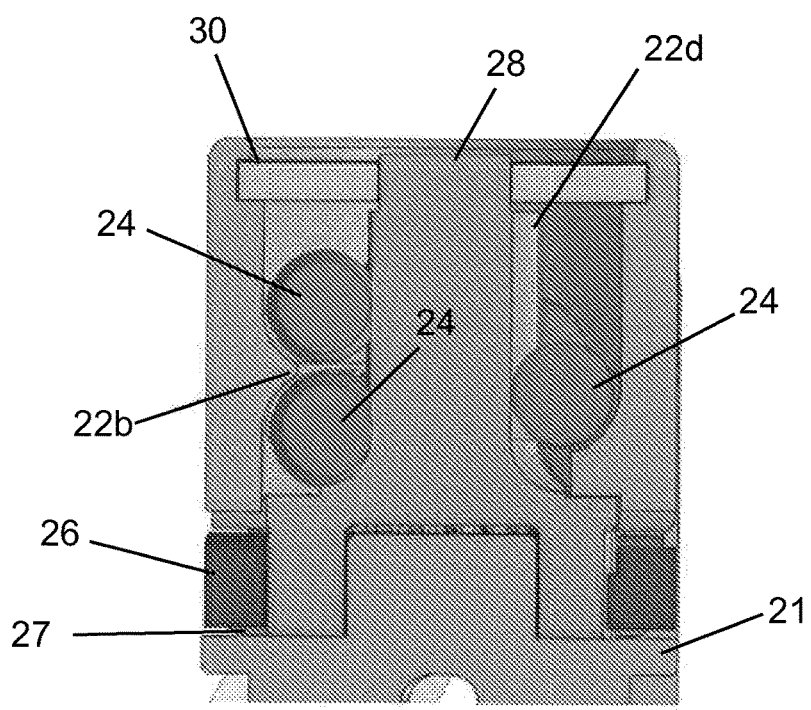
FIGS. 8a and 8b are close up cutaway views of the ball housing of the pretensioning device of FIG. 3.
Figure 8B:
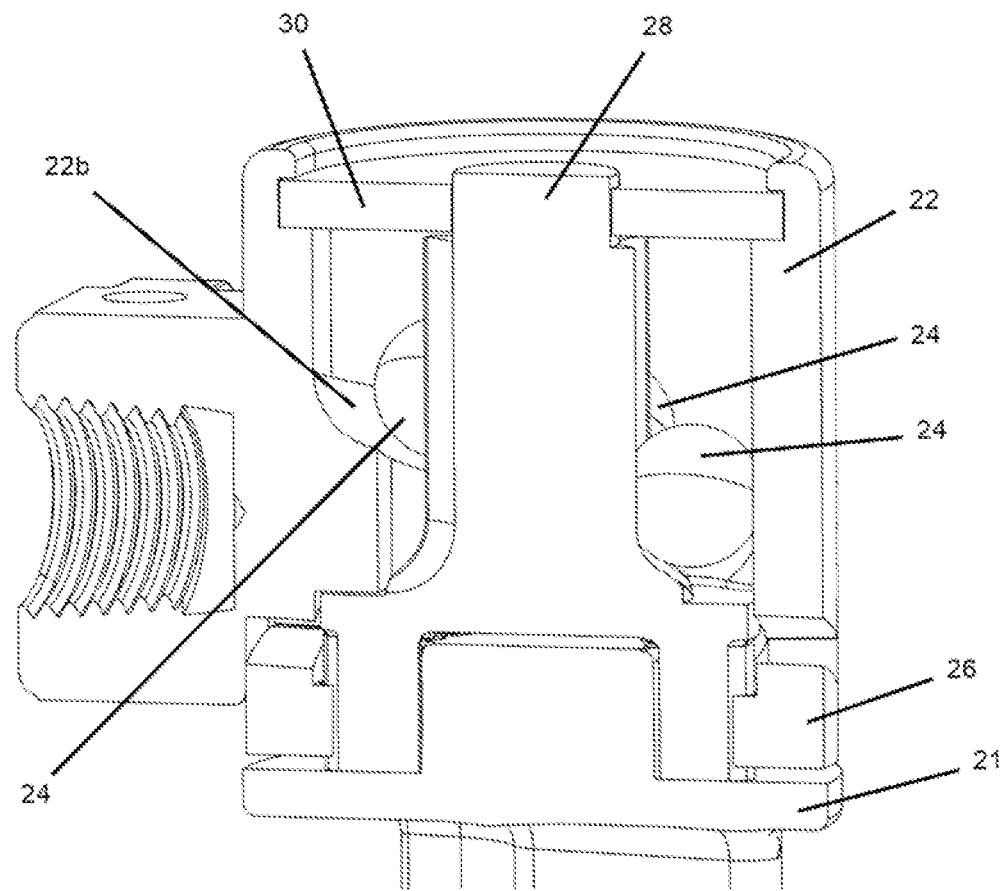
Figure 9A:
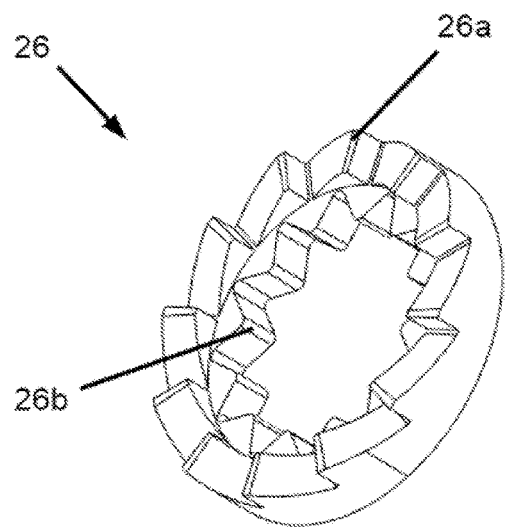
FIG. 9A is a close up view of a ratchet ring of the pretensioning device of FIG. 3.
Figure 9B:
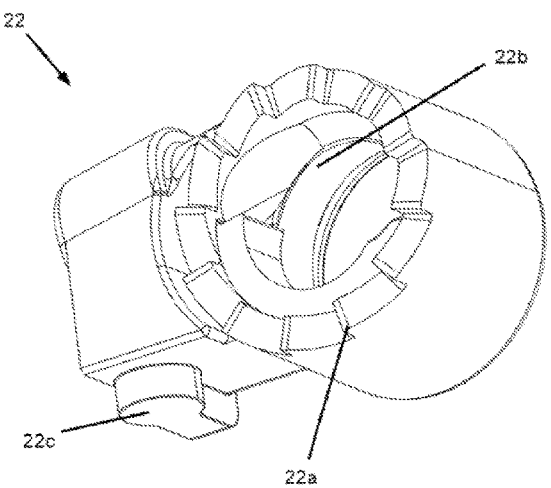
FIG. 9B is a close up view of a ball housing of the pretensioning device of FIG. 3.
Figure 9C:
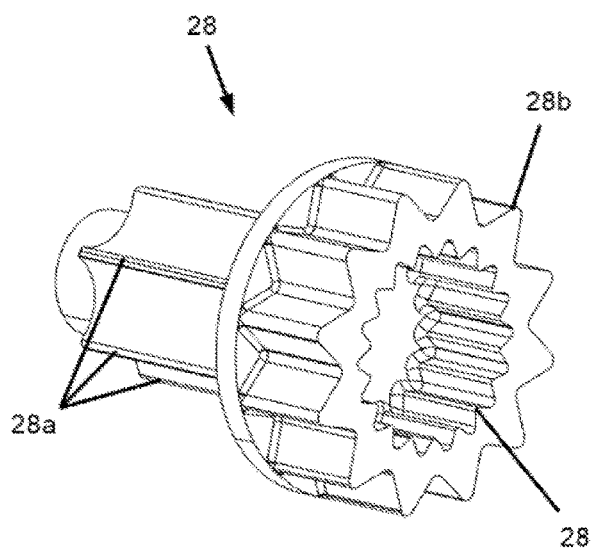
FIG. 9C is a close up view of a drive wheel of the pretensioning device of FIG. 3.
Figure 9D:
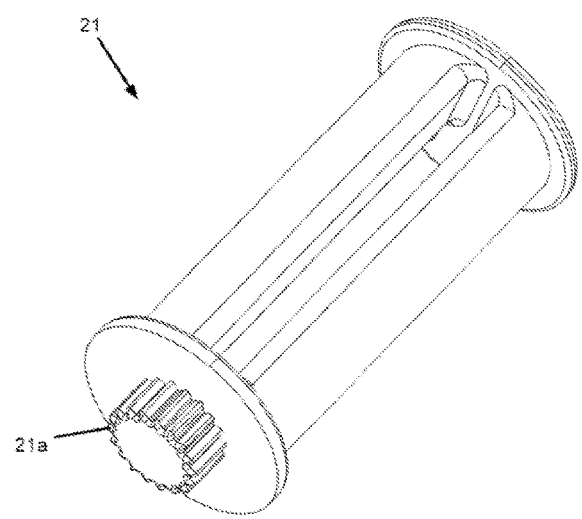
FIG. 9D is a close up view of a spool of the pretensioning device of FIG. 3.

As shown in FIG. 6, the drive wheel has a plurality of projections 28a that are formed and extend along an outer circumferential surface of the drive wheel 28. The plurality of projections 28a are configured to be engaged with the power transmission members 24. It should be noted that the shape, number, and disposition of the projections 28a may be designed according to the structure of the power transmission members 24, and are not limited to the structure shown in the drawings. The external spline 28b of the drive wheel engages the internal spline 26b of the ratchet ring 26 and allows the ratchet ring 26 to be rotationally locked with the drive wheel 28. Ramp 22b is disposed in the ball housing 22 and circumferentially extends along the interior wall 22d in a spiral pattern. Ramp 22b guides the power transmission members 24 spirally towards the end cap 30 as shown in FIG. 8.

FIGS. 9A-9D show the components of the locking mechanism that includes the ratchet ring 26, ball housing 22, drive wheel 28, and spool 21. The ratchet ring 26 includes the internal spline 26b that locks and engages with the external spline 28b of the drive wheel 28, allowing the ratchet ring 26 to be rotationally locked to the drive wheel 28. The drive wheel 28 includes an internal spline 28c that engages an external spline 21a of the spool 21, allowing the drive wheel 28 to be rotationally locked to the spool 21. This configuration rotationally locks the ratchet ring 26, the drive wheel 28, and the spool 21 together. The ratchet ring teeth 26a are configured to engage ball housing teeth 22a in the pretensioning direction (i.e. the direction in which the webbing of the seat belt is wound around the spool). The configuration of the teeth 26a and 22a that is shown in the drawings is only exemplary and may be configured such that the engagement direction of the teeth 26a and 22a coincides with the rotation direction of the extraction or pulling of the webbing of the spool. The ball housing 22 may include a ball housing projection 22c configured to be engaged to the frame 20. The ramp 22b is disposed on the interior wall of the ball housing 22 and is configured to provide a spiral path for the power transmission members 24.

Figure 10:
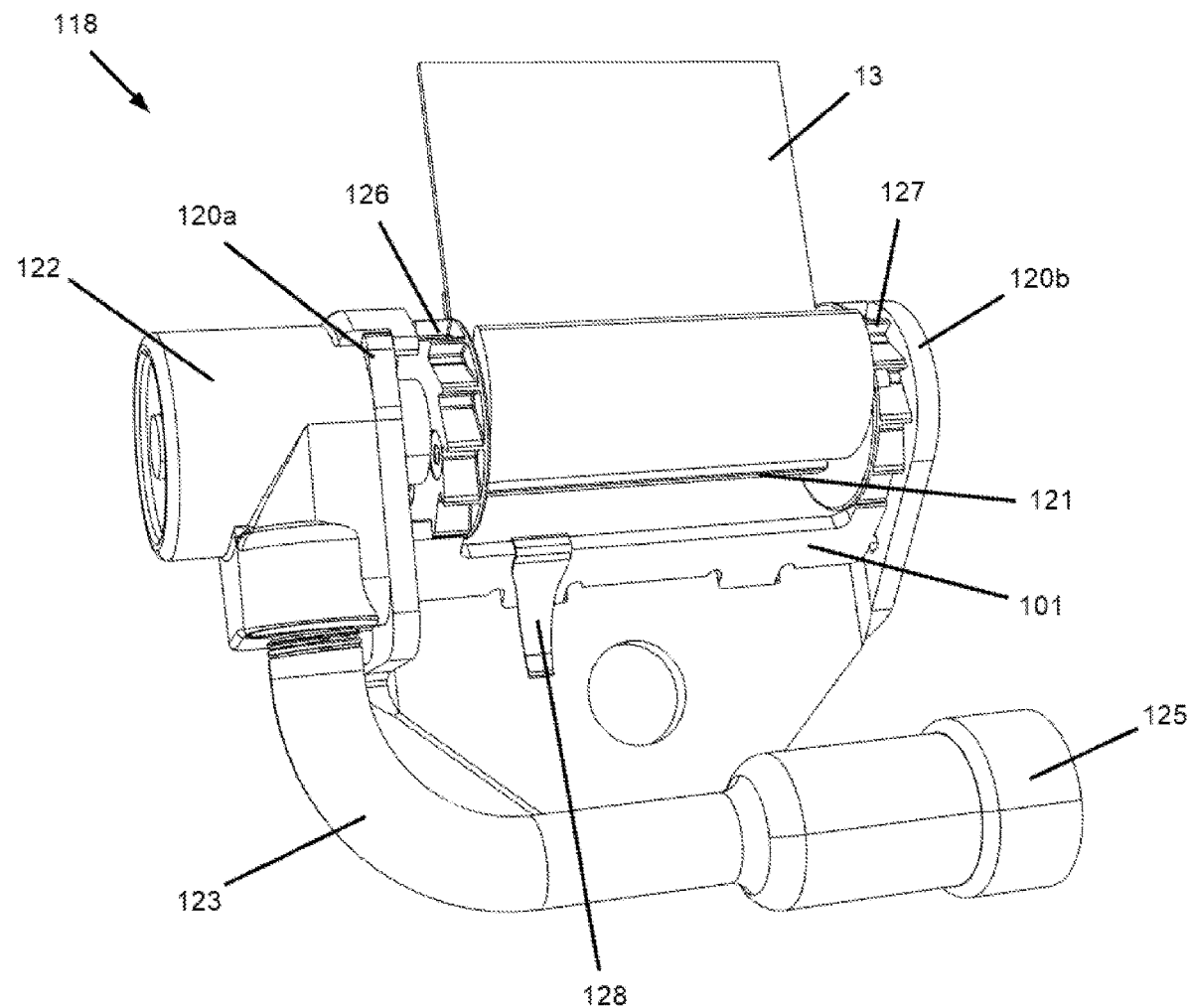
FIG. 10 is another embodiment of the pretensioning device of the seat belt system of FIGS. 1-2.

FIG. 10 shows a second embodiment of a pretensioner 118. The pretensioner 118 may be located similarly in the vehicle 10 in place of pretensioner 18 as shown in FIGS. 1 and 2. Pretensioner 118 includes a similar drive mechanism to the embodiment described above. The pretensioner 118 may include a pawl 101 attached to a frame 120. The pawl 101 extends longitudinally across the frame between two flanges 120a and 120b of the frame 120. A spool 121 is configured to be rotationally disposed on the frame 120. A webbing 13 is attached to the spool and is configured to be wound around the spool 121 during a pretensioning event. The pawl 101 is rotatably connected to the frame 120 and biased toward the spool 121 via a spring retaining clip 128 attached to the frame 120. A pair of ratchet wheels 126 and 127 are disposed at the longitudinal ends of the spool 121 and located between the spool 121 and the respective flanges 120a and 120b. The ratchet wheels 126 and 127 are rotationally locked onto the spool 121 and may be coaxial with the axis of rotation of the spool 121. Similar to the first embodiment described above, during a pretensioning event, power transmission members (not shown) inside pipe 123 are pushed by gas provided by a gas generator 125 into the ball housing 122 to rotate a drive wheel (not shown) in the pretensioning direction.

During operation of the pretensioner 118, the drive wheel rotates the spool 121 in the pretensioning direction and winds the webbing 13 around the spool 121 in order to remove slack in the webbing from the passenger. The pawl 101 includes two free ends that are configured to engage the ratchet wheels 126 and 127 when occupant loading from the sudden vehicle deceleration pulls the webbing and imparts a force in the engagement direction on the spool. The spring retaining clip 128 biases the pawl 101 against the ratchet wheels 126 and 127. The teeth on the ratchet wheels ride over the free ends of the pawl 101 to thereby allow the ratchet wheels 126 and 127 to rotate in the pretensioning direction (i.e. when the webbing is retracted). The ratchet wheels 126, 127 ride over the pawl 101 during pretensioning. However, after pretensioning, the free ends of the pawl 101 engage the ratchet wheels 126 and 127 to prevent the spool from rotating in the engagement direction thereby preventing the webbing 13 from being extracted once the pawl engages the ratchet wheels. Details of the ball housing 122, pipe 123, drive wheel (inside ball housing 122), frame 120, and spool 121 are similar to counterparts shown and described in the first embodiment.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "upstream," "downstream," "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat belt pretensioner as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions and arrangement of the various exemplary embodiments without departing from the scope of the present disclosure.

What is claimed is:

1. A seat belt pretensioner for a seat belt device in a vehicle, the pretensioner comprising:
    a frame;
    a ball housing attached to the frame;
    a drive wheel located within the ball housing;
    a spool rotationally locked to the drive wheel and configured to be fixed to one end of a webbing so that the webbing may be wound around the spool, the spool being rotatably mounted to the frame and configured to rotate in a pretensioning direction in response to an acceleration of the vehicle greater than a predetermined high acceleration;
    a first ratchet wheel disposed adjacent to the spool and located at a first end of the spool;
    a pawl attached to the frame is configured to engage the first ratchet wheel;
    at least one ball shaped power transmission element carried in a pipe that is driven by gas provided from a gas generator when the pretensioner device is activated so that the at least one power transmission element can contact the drive wheel to thereby rotate the spool in the pretensioning direction; and
    wherein the first ratchet wheel is configured to engage the pawl when the webbing is pulled in an engagement direction, wherein the engagement direction is opposite of the pretensioning direction.

2. The seat belt pretensioner of claim 1, wherein the ball housing comprises a ramp configured to allow the at least one transmission element to travel in a spiral path in the ball housing.

3. The seat belt pretensioner of claim 2, further comprising an end cap wherein the at least one transmission element is configured to move towards the end cap in the spiral path of the ball housing.

4. The seat belt pretensioner of claim 1, further comprising a second ratchet wheel disposed adjacent to the spool and located at a second end of the spool, wherein the pawl extends the length of the spool and is configured to engage the second ratchet wheel.

5. The seat belt pretensioner of claim 4, wherein the pawl includes two free ends and wherein each of the free ends engages one of the first and second ratchet wheels when the webbing is pulled in the direction opposite the pretensioning direction.

6. The seat belt pretensioner of claim 4, wherein the pawl is biased toward the ratchet wheels by a spring retaining clip.

7. A pretensioner for a seat belt device in a vehicle, the pretensioner comprising:
    a frame;
    a ball housing attached to the frame;
    a drive wheel located within the ball housing;
    a rotating spool connected to the drive wheel and configured to be fixed to one end of a seat belt webbing so that the webbing may be wound around the spool, the spool being rotatably mounted to the frame and configured to rotate in a pretensioning direction in response to an acceleration of the vehicle greater than a predetermined high acceleration;
    a pipe connected to the ball housing;
    a gas generator connected to the pipe;
    at least one ball shaped power transmission element carried in the pipe that is driven by gas provided from the gas generator when the pretensioner device is activated so that the at least one power transmission element can contact the drive wheel to thereby rotate the spool to retract the seat belt; wherein at least one seal member is located between the at least one power transmission element and the gas generator, wherein the seal member is configured to travel through the pipe after the pretensioner device is activated and is sized to plug the pipe at an inlet to the ball housing;
    a first ratchet wheel disposed adjacent to the spool and located at a first end of the spool; and
    a pawl attached to the frame configured to engage the first ratchet wheel;
    wherein the first ratchet wheel is configured to engage the pawl when the webbing is pulled in an engagement direction, wherein the engagement direction is opposite to the pretensioning direction.

8. The pretensioner of claim 7, further comprising a second ratchet wheel disposed adjacent to the spool and located at a second end of the spool, wherein the pawl extends the length of the spool and is configured to engage the second ratchet wheel; wherein the pawl includes two free ends and wherein each of the free ends engages one of the first and second ratchet wheels when the webbing is pulled in the direction opposite the pretensioning direction.

9. The seat belt pretensioner of claim 7, wherein the ball housing comprises a ramp configured to allow the at least one transmission element to travel in a spiral path in the ball housing.

10. The seat belt pretensioner of claim 9, further comprising an end cap wherein the at least one transmission element is configured to move towards the end cap in the spiral path of the ball housing.

11. The seat belt pretensioner of claim 7, further comprising a second ratchet wheel disposed adjacent to the spool and located at a second end of the spool, wherein the pawl extends the length of the spool and is configured to engage the second ratchet wheel.

12. The seat belt pretensioner of claim 11, wherein the pawl includes two free ends and wherein each of the free ends engages one of the first and second ratchet wheels when the webbing is pulled in the direction opposite the pretensioning direction.

13. The seat belt pretensioner of claim 11, wherein the pawl is biased toward the ratchet wheels by a spring retaining clip.

14. A seat belt pretensioner for a seat belt device in a vehicle, the pretensioner comprising:
- a frame;
- a housing attached to the frame;
- a drive wheel located within the housing;
- a spool rotationally locked to the drive wheel and configured to be fixed to one end of a webbing so that the webbing may be wound around the spool, the spool being rotatably mounted to the frame and configured to rotate in a pretensioning direction in response to an acceleration of the vehicle greater than a predetermined high acceleration;
- a first ratchet wheel disposed adjacent to the spool and located at a first end of the spool;
- a pawl attached to the frame is configured to engage the first ratchet wheel;
- at least one power transmission element carried in a pipe that is driven by gas provided from a gas generator when the pretensioner device is activated so that the at least one power transmission element can contact the drive wheel to thereby rotate the spool in the pretensioning direction; and
- wherein the first ratchet wheel is configured to engage the pawl when the webbing is pulled in an engagement direction, wherein the engagement direction is opposite of the pretensioning direction.

15. The seat belt pretensioner of claim 14, wherein the at least one power transmission element comprises at least one ball or spherical shaped body.

16. The seat belt pretensioner of claim 15, wherein the at least one ball or spherical shaped body is formed from metal.

17. The seat belt pretensioner of claim 14, wherein the at least one power transmission element comprises a polymer rod.

18. The seat belt pretensioner of claim 14, further comprising a second ratchet wheel disposed adjacent to the spool and located at a second end of the spool, wherein the pawl extends the length of the spool and is configured to engage the second ratchet wheel.

19. The seat belt pretensioner of claim 18, wherein the pawl includes two free ends and wherein each of the free ends engages one of the first and second ratchet wheels when the webbing is pulled in the direction opposite the pretensioning direction.

20. The seat belt pretensioner of claim 18, wherein the pawl is biased toward the ratchet wheels by a spring retaining clip.

* * * * *